United States Patent Office 2,899,439
Patented Aug. 11, 1959

2,899,439

5-LOWER-CARBOXAMIDO-1,3,4-THIADIAZOLE-2-SULFENAMIDE

Jerome Korman, Portage Township, Kalamazoo County, Mich., assignor to The Upjohn Company, Kalamazoo, Mich., a corporation of Michigan No Drawing. Application April 30, 1958
Serial No. 731,884

2 Claims. (Cl. 260—306.8)

This invention relates to new compounds, lower-carboxamido-1,3,4-thiadiazole-2-sulfenamides, having the following structural formula

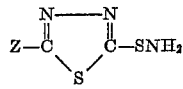

wherein Z is a lower-carboxamido group.

In the preparation of the novel compounds of the invention, 5-lower-carboxamido-1,3,4-thiadiazole-2 - thiol is converted to the corresponding sulfenamide by oxidative condensation with an amide-forming nitrogen compound which can be carried out in one step [see Carr, Smith, and Alliger, J. Org. Chem. 14: 921–34 (1949); Tschunkur and Kohler, U.S. Patent 2,045,888; Ashworth, U.S. Patent 2,268,467; Carr, U.S. Patent 2,271,834; and Harman, U.S. Patents 2,191,656-7], or in two steps via an N-chloroamine [see Hanslick, U.S. Patent 2,261,024; British Patent 377,730; and Alliger, U.S. Patents 2,495,-085 and 2,581,921], or in two steps via the disulfide [see Busch, Ber. 29: 2127 (1896); Tschunkur and Kohler, U.S. Patent 2,045,888].

When ammonia is used the unsubstituted amide is obtained. By substituting methylamine for ammonia, the corresponding N-methyl sulfonamide is obtained. In the like manner, by substituting secondary amines and other primary amines in the above reactions, there are also obtained the corresponding N,N-dimethyl, N-n-butyl, N-isobutyl, N-sec-butyl, N-tert-butyl, N,N-diisopropyl, N-methyl-N-ethyl, N-2-aminoethyl, N-(2-ethylhexyl), N-cyclo-hexyl, N-methyl-N-cyclohexyl, N-cyclopentyl, and like N-mono- and N-di-lower-alkyl and cycloalkyl sulfonamides; N-2-pyridyl, N-2-thiazolyl, N-2-pyrimidyl, and like N-heterocyclic sulfonamides; and N-phenyl, N-methyl-N-phenyl, N-2-thienyl, N-thenyl, N-2-furyl, N-furfuryl, N-tolyl, N-benzyl, N-phenethyl, and like N-aryl and N-aralkyl sulfonamides. Also by substituting the ammonia by a heterocyclic secondary amine such as piperidine, pyrrolidine, piperazine, N-methyl-piperazine, morpholine, and the like, as well as the lower-alkyl derivatives thereof, such as 2-methylpiperidine, 2,2,-dimethylpyrrolidine, and the like, there are obtained the corresponding sulfonamides in which the amide nitrogen is comprised in a heterocycle. Thus the —NH$_2$ group in the above formulas can be replaced by the group —NR'R" in which R' and R", representatively, are hydrogen, lower-alkyl, lower-cycloalkyl, lower-aryl, or lower-aralkyl, and together a lower-alkelene, lower-oxalkylene, or lower-azalkylene radical forming with the nitrogen a five to six membered heterocyclic ring.

The invention may be more fully understood by reference to the following examples which are illustrative only and not intended to be limiting.

EXAMPLE 1

A. 5-acetamido-1,3,4-thiadiazole-2-sulfenamide

A solution prepared by dissolving 17.5 grams (0.1 mole) of 5-acetamido-1,3,4-thiadiazole-2-thiol [Guha, J. Am. Chem. Soc. 44: 1502 (1922)], in 75 milliliters of water containing five grams of sodium hydroxide, and 75 milliliters of ten percent sodium hypochlorite solution were added simultaneously to 300 milliliters of concentrated ammonium hydroxide which was cooled to zero degrees centigrade, and vigorously stirred. During the addition the temperature was not allowed to rise above five degrees centigrade. The resulting solid was recovered by filtration, washed thoroughly with water, dried at room temperature under reduced pressure, and recrystallized from ethyl acetate.

The 5-acetamido-1,3,4-thiadiazole-2-sulfenamide thus produced is useful as an accelerator in the vulcanization of rubber or as an intermediate for the preparation of the corresponding sulfonamide in accordance with the following:

B. 5-acetamido-1,3,4-thiadiazole-2-sulfonamide

A solution of 2.85 grams (0.015 mole) of the sulfenamide of Example 1–A in 100 milliliters of acetone was treated dropwise, with stirring, with a solution of 3.5 grams of potassium permanganate in 100 milliliters of water. The temperature rose to 42 degrees centigrade. After stirring an additional ten minutes the reaction mixture was filtered to remove manganese dioxide, the latter was washed with 100 milliliters of warm water, and the combined filtrates were concentrated under reduced pressure to remove acetone. The residual solution was treated with charcoal, filtered, and acidified with concentrated hydrochloric acid. After standing in the refrigerator for four hours the solid sulfonamide was recovered by filtration, washed with water, dried, and recrystallized from ethyl acetate-Skellysolve B (technical n-hexane) to give 5-acetamido-1,3,4-thiadiazole-2-sulfonamide melting at about 257–259 degrees centigrade. This sulfonamide is a known diuretic sold under the trademark "Diamox."

By monoacetylating 5-amino-1,3,4-thiadiazole-2-thiol with acylating agents other than acetic anhydride (used by Guha to form the 5-acetamido-1,3,4-thiadiazole-2-thiol) such as propionic, valeric, caprylic, and benzoic anhydrides, or the corresponding acyl halides, and treating the resulting thiol according to this example, there are obtained 5-propionamido-, 5-valeramido-, 5-caprylamido-, and 5-benzamido-sulfenamides and sulfonamides. The latter also are carbonic anhydrase inhibitors having diuretic properties.

Following the procedures of the above example and by substituting the ammonia by a primary or secondary amine, or the ammonia and sodium hypochlorite by an N-chloroamine, or by substituting the thiols by other thiols, there are obtained a wide variety of sulfonamides of the formula:

wherein R, R', and R" are as indicated above.

This application is a continuation-in-part of copending applications Serial No. 462,113, filed October 13, 1954, now Patent No. 2,868,800, and Serial No. 723,136, filed March 24, 1958.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. 5-lower-carboxamido - 1,3,4 - thiadiazole - 2 - sulfenamide.

2. 5-acetamido - 1,3,4 - thiadiazole - 2 - sulfenamide.

References Cited in the file of this patent

UNITED STATES PATENTS

| | | |
|---|---|---|
| 2,476,655 | Fox et al. | July 19, 1949 |
| 2,554,816 | Clapp et al. | May 29, 1951 |
| 2,783,240 | Vaughan et al. | Feb. 26, 1957 |

OTHER REFERENCES

Northey: The Sulfonamides and Allied Comp'ds, (ACS Monograph No. 106, 1948), page 258.